United States Patent Office 2,710,125
Patented June 7, 1955

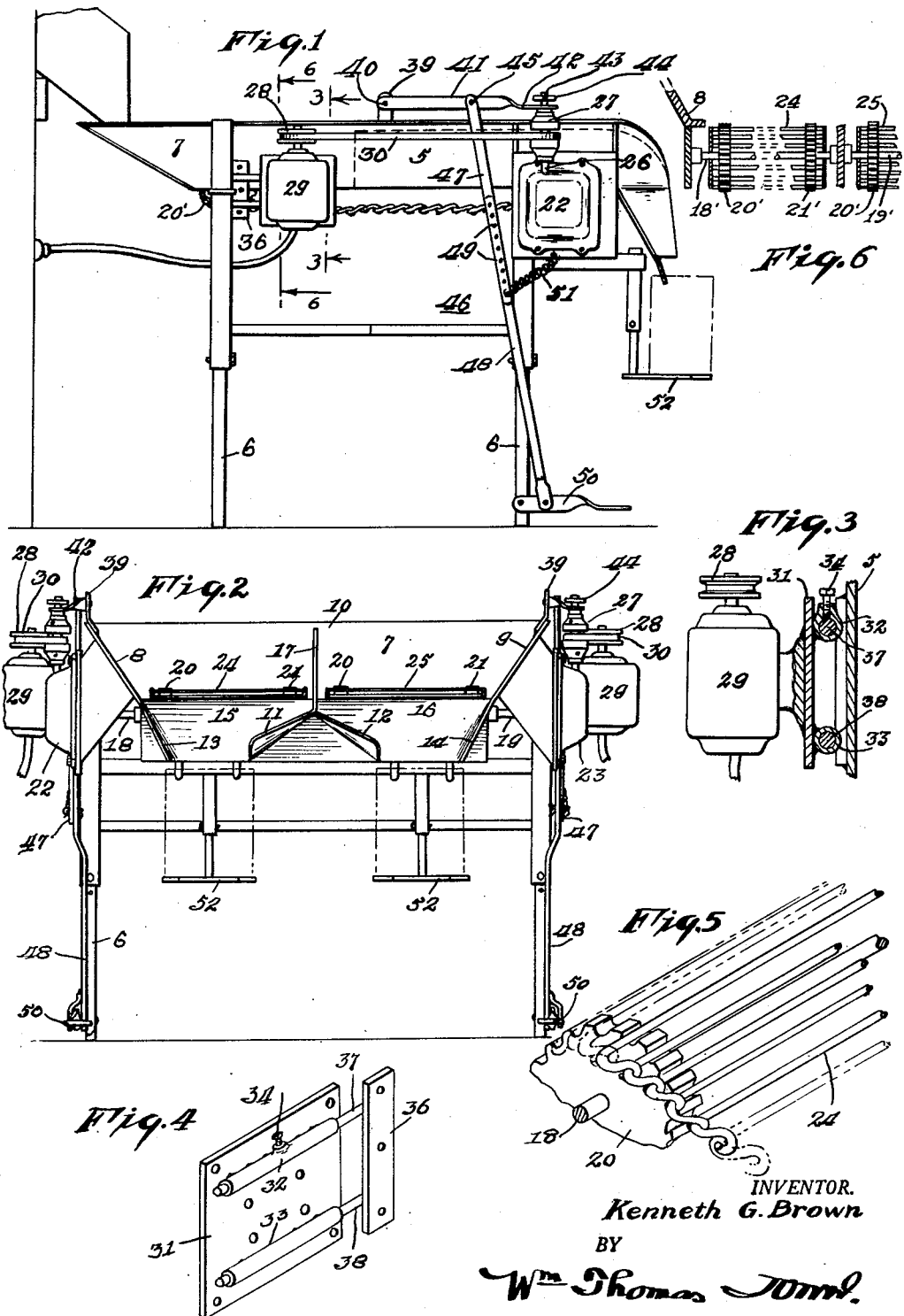

2,710,125

MACHINES FOR BAGGING POTATOES

Kenneth G. Brown, Mattituck, N. Y.

Application September 13, 1952, Serial No. 309,450

4 Claims. (Cl. 226—58)

This invention relates to improvements in a machine for bagging potatoes, or the like.

The improvements reside in the provision of a machine of this type in which potatoes are rapidly conveyed from a hopper to bags; which may be started and stopped instantly; which permits of ready inspection of the potatoes for the purpose of eliminating those which are defective; and which may be adjusted to varying heights in accordance with the requirements of any given installation.

In the accompanying drawings:

Fig. 1 is a side elevation of the machine embodying my invention, and

Fig. 2 is a front elevation thereof.

Fig. 3 is a transverse section along lines 3—3 of Fig. 1.

Fig. 4 is a perspective view of the motor mounting, and

Fig. 5 is a fragmentary perspective of one of the sprockets and the link conveyor.

Fig. 6 is a section view taken through lines 6—6 of Fig. 1.

In the drawings, 5 is a rectangular support sustained at the proper elevation by telescopically adjustable legs 6. Mounted on the support is a hopper 7 with flared sides 8—9 and rear end 10. The front end of the hopper is inclined downwardly and the medial portion thereof is divided to form a pair of upwardly converging shoulders or flanges 11—12, which taken in conjunction with the projected sides 13—14 of the hopper, present dual runways 15—16. Above the arch of the shoulders an abbreviated partition 17 extends vertically and rearwardly and functions as a separator. Behind the inner end of the partition, the hopper is constructed with spacious dimensions to permit the feeding of a copious supply of potatoes or other items which it is proposed to bag.

At opposite longitudinal ends of the hopper are disposed transverse shafts 18—19 and 18', 19' having terminal sprockets 20—21 and 20', 21' respectively and suitably connected at their outer extremities to gear reduction units 22—23. And trained over the sprockets are endless link conveyors 24—25 (see Fig. 5).

Rising from each reduction unit is a vertical shaft 26 carrying a clutch 27, which is connected to the pulley 28 of motor 29 by belt 30. The motor at the rear thereof is equipped with a plate 31 having a pair of spaced tubular sleeves 32—33, the upper sleeve having a set screw 34. Suitably fixed to the frame 5 is a metallic strip 36 upon which are mounted a pair of rods 37—38 adapted to register with and slide in sleeves 32—33. By appropriately manipulating the single screw 34, the entire motor may be moved forwardly or backwardly to secure the desired adjustment of the belt with respect to the clutch.

On each side of the frame is an upright 39 to which is pivoted at 40 the inner terminal of a horizontal lever 41, the outer extremity 42 of the lever being flexed at right angles so as to engage the vertical stub shaft 43 of the clutch and maintained in this position by cross-pin 44. Approximately midway of lever 41, as at 45, is pivoted a depending vertical lever 46 comprising a pair of overlapping bars 47—48. Upper bar 47 is perforated longitudinally at 49 to receive any suitable pin and thus enable adjustment of the lever to compensate for adjustment of legs 6. Lower bar 48 is pivoted to pedal 50, and the lever 46 in its entirety is yieldably connected to the frame by a spring 51.

Below each of the runways 15—16 is a bag-rest 52 also adjustable.

Upon energizing the motor 29, belt 30 idles with respect to the lower part of the clutch 27. Then by depressing pedal 50, the upper part of the clutch is constrained downwardly to engage the belt and thereby transmit power to either of the conveyors 24—25 through shafts 18—19. Potatoes fed into the hopper from any suitable source, are then inspected by an attendant at the rear of the machine, who discards the defective ones—the good ones being carried forwardly by the conveyor and rolling down the runway into the bag until a certain weight is reached, when the attendant in front of the runway removes the filled bag and substitutes an empty one.

Either conveyor may be operated independently, or they may be run simultaneously. In fact, although not shown, the conveyor and its accessories may be tripled or quadrupled without departing from the spirit of my invention.

Of special importance is the set-up of the hopper taken in conjunction with the conveyors. It enables one, instead of two attendants, to inspect the items as they are fed into the hopper prior to passing on to the conveyors and thus minimizes the cost of operation.

Moreover, the height of the machine and the operating levers may be expeditiously adjusted to accommodate any conditions. Still further, the flaring of the sides of the hopper, as at 8 and 9, relieves the conveyors from the full weight of potatoes and insures longer life of the links.

I claim:

1. A machine for bagging materials of the class described, comprising a support, a hopper having flared longitudinal sides, an enlarged portion at its inner end for receiving materials to be bagged, a partition disposed transversely of the middle of the hopper and terminating short of the inner end, a depending discharge runway at the outer end, a pair of upwardly converging flanges on the medial portion of said runway, meeting the partition at its outer end providing dual runways, a shaft disposed transversely adjacent to each end of the hopper, sprockets carried at opposite terminals of the shaft, the shaft adjacent to the front end of the hopper connected at its outer extremity to a gear reduction unit, a vertical shaft rising from the said unit carrying a clutch, said clutch connected to the pulley of a motor positioned at the rear of the apparatus by means of a belt, a conveyor meshing with the sprockets, a bag rest below the discharge runway, legs for the support, a pedal at the base of one of the legs, and adjustable linkage between the clutch and the pedal substantially vertically paralleling said leg.

2. A machine for bagging materials of the class described, comprising a support, a hopper having flared longitudinal sides, an enlarged portion at its inner end for receiving materials to be bagged, a partition disposed transversely of the middle of the hopper and terminating short of the inner end, a depending discharge runway at the outer end, a pair of upwardly converging flanges on the medial portion of said runway, meeting the partition at its outer end providing dual runways, a shaft disposed transversely adjacent to each end of the hopper, sprockets carried at opposite terminals of the shaft, the shaft adjacent to the front end of the hopper connected at its outer extremity to a gear reduction unit, a vertical shaft rising from the said unit carrying a clutch, said clutch connected to the pulley of a motor positioned at the rear of the apparatus by means of a belt, means to adjustably position the motor to tension the belt, a conveyor meshing with the sprockets, a bag rest below the discharge runway, legs for the support, means to connect with and to disconnect the said belt from driving the said shaft.

3. A machine for bagging materials of the class described, comprising a support, a hopper having flared longitudinal sides, an enlarged portion at its inner end for receiving materials to be bagged, a partition disposed transversely of the middle of the hopper and terminating short of the inner end, a depending discharge runway at the outer end, a pair of upwardly converging flanges on the medial portion of said runway, meeting the partition at its outer end providing dual runways, shafts disposed transversely adjacent each end of the hopper, sprockets carried at opposite terminals of the shafts, the shafts adjacent the front end of the hopper connected at their outer extremities to gear reduction units, vertical shafts rising from said units carrying clutches, said clutches connected to the pulleys of motors positioned at the rear of the apparatus by means of belts, conveyors meshing with the sprockets, bag rests below the discharge runways, legs for the front and rear of the support, pedals at the bases of the support, and adjustable linkage between the clutches and the pedals substantially vertically parallelling said leg, whereby upon energizing the motors and depressing the pedals the conveyors will carry material from the inner end of the hopper to discharge it down the runways at the front end thereof.

4. A machine for bagging potatoes comprising a support, a hopper having flared longitudinal sides, an enlarged portion at its inner end for receiving materials to be bagged, a partition disposed transversely of the middle of the hopper and terminating short of the inner end, a depending discharge runway at the outer end, a pair of upwardly converging flanges on the medial portion of said runway meeting the partition at its outer end providing dual runways, shafts disposed transversely adjacent each end of the hopper and in substantially the same longitudinal plane, sprockets carried at opposite terminals of the shafts, the shafts adjacent the front ends of the hopper connected at their outer extremities to gear reduction units, vertical shafts rising from said units carrying clutches, said clutches connected to the pulleys of motors adjustably positioned at the rear of the apparatus by means of belts, conveyors meshing with the sprockets, bag rests below the discharge runways for holding bags positioned by hand thereon, legs for the front and rear of the support, pedals at the bases of the support and adjustable linkage between the clutches and the pedals substantially vertically paralleling said legs, whereby upon energizing the motor and depressing the pedals, the conveyors carry materials from the inner end of the hopper to fill the bags and upon releasing the pedals the conveyors are stopped for placing empty bags on the bag rests.

References Cited in the file of this patent

UNITED STATES PATENTS

| | | |
|---|---|---|
| 1,849,256 | Trovation | Mar. 15, 1932 |
| 1,927,318 | McEntee et al. | Sept. 19, 1933 |
| 2,325,919 | Porch | Aug. 3, 1943 |
| 2,523,562 | Eakin et al. | Sept. 26, 1950 |
| 2,569,711 | Foster | Oct. 2, 1951 |
| 2,647,670 | Cox | Aug. 4, 1953 |